United States Patent
Shibata

(10) Patent No.: US 9,515,527 B2
(45) Date of Patent: Dec. 6, 2016

(54) ELECTRIC MOTOR AND PRODUCTION METHOD FOR THE ELECTRIC MOTOR

(71) Applicant: JTEKT CORPORATION, Osaka-shi, Osaka (JP)

(72) Inventor: Yoshiyuki Shibata, Toyota (JP)

(73) Assignee: JTEKT CORPORATION, Osaka (JP)

( * ) Notice: Subject to any disclaimer, the term of this patent is extended or adjusted under 35 U.S.C. 154(b) by 283 days.

(21) Appl. No.: 13/919,392

(22) Filed: Jun. 17, 2013

(65) Prior Publication Data

US 2014/0001910 A1    Jan. 2, 2014

(30) Foreign Application Priority Data

Jun. 29, 2012    (JP) ................................ 2012-147208

(51) Int. Cl.
| | | |
|---|---|---|
| H02K 21/12 | (2006.01) | |
| H02K 15/12 | (2006.01) | |
| H02K 15/02 | (2006.01) | |
| H02K 1/27 | (2006.01) | |
| H02K 15/03 | (2006.01) | |

(52) U.S. Cl.
CPC ............ *H02K 1/2773* (2013.01); *H02K 15/03* (2013.01); *H02K 2201/06* (2013.01); *Y10T 29/49012* (2015.01)

(58) Field of Classification Search
CPC .. H02K 1/2773; H02K 15/03; H02K 2201/06; Y10T 29/49012
USPC ............ 310/156.47, 156.43, 44; 29/596, 598
See application file for complete search history.

(56) References Cited

U.S. PATENT DOCUMENTS

| | | | |
|---|---|---|---|
| 5,034,642 A | 7/1991 | Hoemann et al. | |
| 6,384,503 B1 | 5/2002 | Iwaki et al. | |
| 6,630,762 B2 * | 10/2003 | Naito ..................... | H02K 15/03 310/156.53 |
| 8,247,940 B2 * | 8/2012 | Hino et al. ............... | 310/156.47 |
| 2003/0164655 A1 * | 9/2003 | Biais .................... | H02K 1/2726 310/156.53 |
| 2004/0245880 A1 * | 12/2004 | Liang ....................... | 310/156.47 |
| 2006/0290220 A1 | 12/2006 | Ionel et al. | |

(Continued)

FOREIGN PATENT DOCUMENTS

JP    A-2002-136011    5/2002

OTHER PUBLICATIONS

Extended European Search Report issued in European Application No. 13173245.5 dated Feb. 19, 2014.

*Primary Examiner* — Terrance Kenerly
*Assistant Examiner* — Ahmed Elnakib
(74) *Attorney, Agent, or Firm* — Oliff PLC

(57) ABSTRACT

A plurality of lamination steel sheets that form a rotor core are stacked so that the lamination steel sheets are angularly shifted from each other, and a plurality of cavities are formed. Permanent magnets are molded and disposed in the cavities by injection molding. Each permanent magnet has a uniform plate thickness, and is bent with respect to an axial direction so as to have a triangular wave shape or an S shape. The permanent magnets are magnetized after being disposed in the cavities. The paired magnet pieces have poles of the same polarity, which face each other in the circumferential direction of a rotor, and each of the magnet pieces is magnetized in directions of normals to a surface of the magnet piece, the surface having a linear sectional shape.

9 Claims, 3 Drawing Sheets

(56) References Cited

U.S. PATENT DOCUMENTS

2009/0322175 A1* 12/2009 Kori ..................... H02K 1/2766
                                                        310/156.41
2012/0007465 A1*  1/2012 Fargo .................... H02K 1/165
                                                        310/216.069
2012/0049663 A1*  3/2012 Mishra ................... H01F 1/083
                                                        310/44
2012/0289370 A1* 11/2012 Yamanishi et al. ............ 474/93

* cited by examiner

US 9,515,527 B2

ELECTRIC MOTOR AND PRODUCTION METHOD FOR THE ELECTRIC MOTOR

INCORPORATION BY REFERENCE/RELATED APPLICATION

This application claims priority to Japanese Patent Application No. 2012-147208 filed on Jun. 29, 2012 the disclosure of which, including the specification, drawings and abstract, is incorporated herein by reference in its entirety.

BACKGROUND OF THE INVENTION

1. Field of the Invention

The invention relates to an electric motor and a production method for the electric motor.

2. Discussion of Background

There are conventional electric motors that include a so-called embedded magnet type rotor in which permanent magnets are embedded and fixed in a rotor core. In an electric motor including the embedded magnet type rotor, reluctance torque is produced in addition to magnet torque produced by the permanent magnets. Therefore, this electric motor has an advantage of being able to produce higher torque than an electric motor that includes a so-called surface magnet type rotor in which permanent magnets are fixed to a surface of a rotor core. For example, there is known an embedded magnet type rotor that uses permanent magnets each of which has an arc shape (i.e., an inverted arc shape) in a section taken along a radial direction of the rotor core, the arc shape protruding toward a rotary shaft of the rotor. In this rotor, the surface areas of the permanent magnets can be made large, as compared to a rotor in which flat plate-shaped permanent magnets are disposed to be orthogonal to radial directions, and therefore it is possible to secure a sufficient number of magnetic fluxes even if permanent magnets whose maximum energy product is small are used (see, for example, Japanese Patent Application Publication No. 2002-136011 (JP 2002-136011 A)).

However, in the rotor described above, each of the permanent magnets is embedded so as to extend linearly in the axial direction of the rotor core, and has a shape that extends along the shortest route connecting two opposite end portions of the rotor in the axial direction. Therefore, the surface area of each magnet, from which magnetic fluxes flow, is not very large. Therefore, if permanent magnets, whose maximum energy product is small and whose magnetic flux density is low, are used, it may be impossible to obtain a sufficient number of magnetic fluxes from the permanent magnets. As a result, in order to meet the demand for increasing the output of the electric motor, the size of the electric motor may be increased, which may lead to increase in the cost.

SUMMARY OF THE INVENTION

The invention provides an electric motor in which a surface area of each of permanent magnets embedded in a rotor core is increased so as to secure a sufficient number of magnetic fluxes of the permanent magnets and to allow size reduction of the electric motor, and provides a production method for the electric motor.

According to a feature of an example of the invention, there is provided an electric motor that includes: a rotor provided on a rotary shaft; and a stator fixed outside an outer peripheral surface of the rotor, the rotor including: a rotor core fixed to the rotary shaft so as to be rotatable together with the rotary shaft; and a plurality of permanent magnets embedded and fixed in the rotor core, wherein the permanent magnets extend in radial directions of the rotor and are spaced from each other in a circumferential direction of the rotor so that the permanent magnets adjacent to each other face each other, and each of the permanent magnets has a uniform thickness and is bent from one end portion of the rotor to the other end portion of the rotor with respect to a direction of the rotary shaft of the rotor so that the permanent magnet has a triangular wave shape in which a plurality of linear portions are sequentially connected, or a generally S shape.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 1 is seen in a direction shown by an arrow X in FIG. 1; FIG. 1 is seen in the direction shown by the arrow X in FIG. 1.

DETAILED DESCRIPTION OF EMBODIMENTS

Hereinafter, embodiments of the invention will be described with reference to the accompanying drawings.

Figure 1:
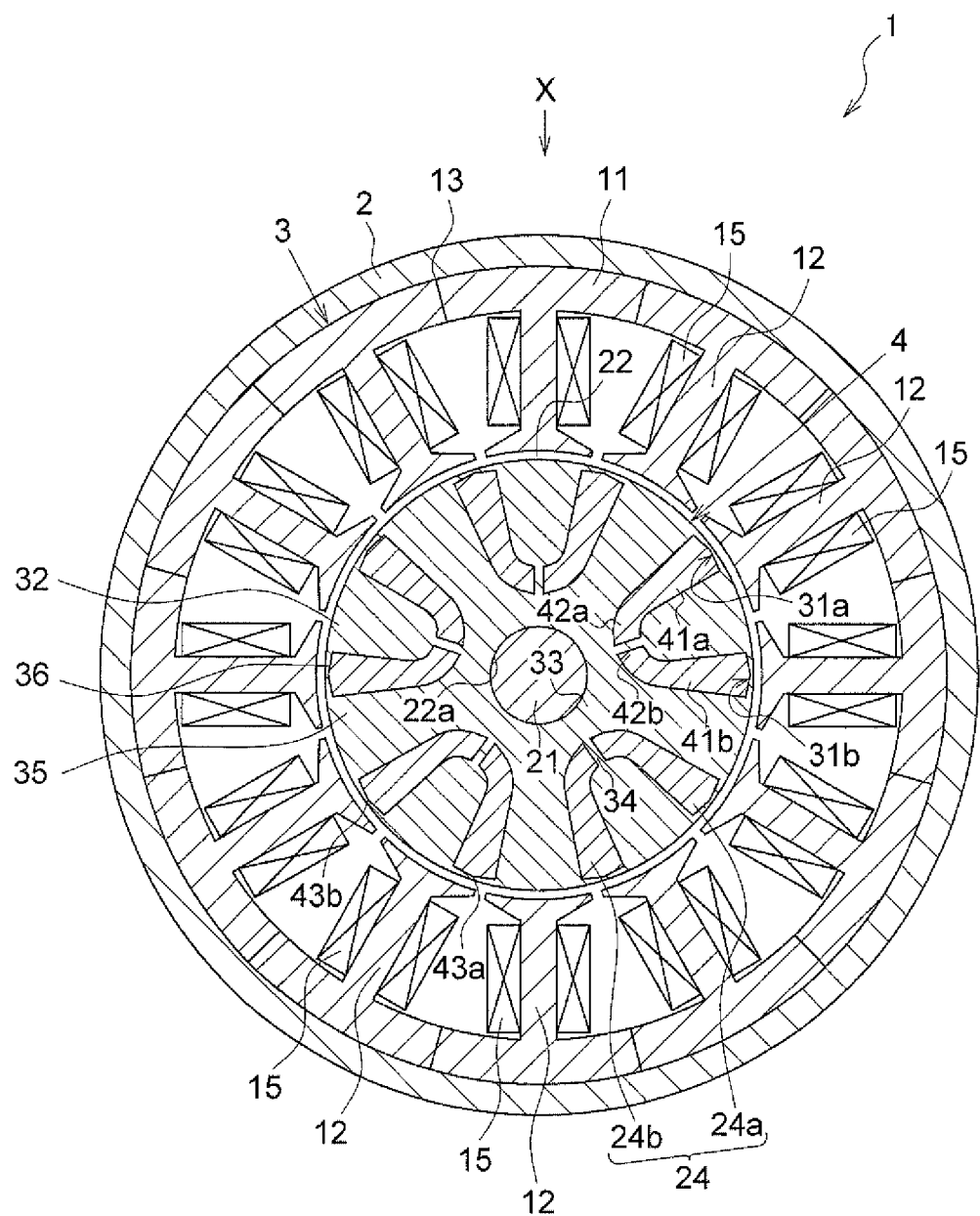
FIG. 1 is a sectional view showing a general configuration of an electric motor in accordance with first and second embodiments of the invention.

FIG. 1 is a sectional view of an electric motor in accordance with first and second embodiments of the invention. An electric motor 1 shown in FIG 1 is mounted, for example, in a vehicle, and used as a drive-source electric motor for driving or actuating an electric power steering device that assists steering operation or an electric pump device that generates hydraulic pressure. As shown in FIG. 1, the motor 1 includes a stator 3 housed in a cylindrical case 2, and a rotor 4 that is rotatably supported at a position radially inside the stator 3. The stator 3 includes a stator core 13 formed by a cylinder portion 11 that has a cylindrical shape and that is fixed to an inner periphery of the case 2 and a plurality of teeth 12 (twelve teeth in this embodiment) that extend radially inward from the cylinder portion 11. A plurality of coils 15 (twelve coils in this embodiment) are wound on the teeth 12.

The rotor 4 includes a rotary shaft 21 and a cylindrical rotor core 22 that is fixed to the rotary shaft 21 so as to be rotatable together with the rotary shaft 21. In the rotor core 22, a plurality of permanent magnets 24 (five permanent magnets in this embodiment), each of which is formed of paired magnet pieces 24a and 24b, are embedded and fixed in the rotor core 22. That is, the rotor 4 of this embodiment is configured as a so-called embedded magnet type rotor.

The electric motor 1 configured as described above has such a configuration that the rotor 4 rotates due to the magnetic attraction and repulsion forces produced between the magnetic field formed by supplying drive electric power to the coils 15, and the magnetic fluxes of the permanent magnets 24.

The rotor core 22 is made of a soft magnetic material, such as iron or electromagnetic steel sheets, and is formed in a generally columnar shape with an insert hole 22a into which the rotary shaft 21 is inserted. The rotor core 22 is provided with a plurality of cavities 31a and 31b within which the magnet pieces 24a and 24b are disposed, respectively. In this embodiment, each of the cavities 31a and 31b is formed in the shape of a hole whose sectional shape is substantially the same as the sectional shape of a corresponding one of the magnet pieces 24a and 24b. Furthermore, each inter-magnet-piece portion 32 of the rotor core 22, which is sandwiched between the magnet pieces 24a and 24b, is connected to a core portion 33 of the rotor core 22, which is fitted to the rotary shaft 21, via a first connecting portion 34 as a connecting portion. Furthermore, the inter-magnet-piece portions 32 are also connected to radially outer end portions of inter-magnet portions 35 of the rotor core 22, via second connecting portions 36. Each of the inter-magnet portions 35 is sandwiched between the adjacent permanent magnets 24. Each first connecting portion 34 is formed in a generally rectangular plate shape that radially extends, and each second connecting portion 36 is formed in a generally rectangular plate shape that circumferentially extends.

The magnet piece 24a and the magnet piece 24b of each permanent magnet 24 are symmetric to each other about a straight line extending in a radial direction of the rotor 4. Specifically, the magnet piece 24a has a magnetic pole-facing portion 41a with a flat plate shape, which radially extends, and a proximity portion 42a that extends from a radially inner end portion of the magnetic pole-facing portion 41a toward the adjacent magnet piece 24b. Similarly, the magnet piece 24b has a magnetic pole-facing portion 41b with a flat plate shape, which extends in the radial direction of the rotor 4, and a proximity portion 42b that extends from a radially inner end portion of the magnetic pole-facing portion 41b toward the adjacent magnet piece 24a. In this embodiment, each of the proximity portions 42a and 42b has an arc curved plate shape such that the proximity portions 42a and 42b approach each other toward a radially inner side. Due to this arrangement, each permanent magnet 24 is formed in a generally arc shape that protrudes toward the rotary shaft 21-side (the radially inner side).

The magnetic pole-facing portions 41a and 41b are magnetized so that the poles of one of the two polarities (the N poles in this embodiment) in the magnetic pole-facing portions 41a and 41b in each permanent magnet 24 face each other in the circumferential direction and so that the poles of the other polarity (the S poles in this embodiment) in the magnet pieces 24a and 24b of adjacent permanent magnets 24 face each other in the circumferential direction. Then, on an outer peripheral surface of the rotor core 22, the magnetic poles of the one polarity are formed at positions corresponding to the inter-magnet-piece portions 32, and the magnetic poles of the other polarity are formed at positions corresponding to the inter-magnet portions 35. That is, the inter-magnet-piece portions 32 and the inter-magnet portions 35 serve as magnetic paths for the magnetic fluxes of the magnet pieces 24a and 24b passing through the outer peripheral surface of the rotor core 22. Furthermore, the proximity portions 42a and 42b are magnetized so that a side of each proximity portion that is close to or in contact with the inter-magnet-piece portion 32 of the rotor core 22 (an inter-magnet-piece portion 32-side of each proximity portion) has the same polarity as the polarity of the inter-magnet-piece portion 32-side of each of the magnetic pole-facing portions 41a and 41b. Specifically, the magnetic pole-facing portions 41a and 41b are magnetized so that the magnetization direction of each magnetic pole-facing portion substantially follows or coincides with the circumferential direction of the rotor 4, and the proximity portions 42a and 42b are magnetized so that the magnetization direction of each proximity portion gradually changes from the circumferential direction to the radial direction toward the distal end of the proximity portion (the radially inner end portion of the proximity portion). In other words, each of the magnet pieces 24a and 24b is magnetized in a direction that substantially coincides with the direction of its plate thickness. The permanent magnets 24 used in the embodiment are bond magnets (plastic magnets, rubber magnets, or the like), and the permanent magnets 24 are magnetized after being disposed in the cavities 31a and 31b.

Each of the magnetic pole-facing portions 41a and 41b is configured so that the magnetic resistance in the magnetization direction is greater in a radially outer portion than in a radially inner portion. Concretely, the magnet pieces 24a and 24b are formed so that the length (thickness) of each of the magnet pieces 24a and 24b in the magnetization direction gradually increases from the distal end portion of the proximity portion 42a or 42b to the radially outer end portion of the magnetic pole-facing portion 41a or 41b. That is, the magnetic pole-facing portions 41a and 41b are formed so that the length of each magnetic pole-facing portion in the magnetization direction is greater in a radially outer portion of the magnetic pole-facing portion than in a radially inner portion thereof Furthermore, the bond magnets used as the permanent magnets 24 (the magnet pieces 24a and 24b) are formed by homogeneously mixing magnet powder into a resin material so that the magnetic resistance per unit length is constant. Therefore, the magnetic resistance of each magnet piece 24a or 24b gradually increases from the distal end of the proximity portion 42a or 42b to the radially outer end portion of the magnetic pole-facing portion 41a or 41b, and the magnetic resistance in the magnetization direction is greater in a radially outer portion of the magnetic pole-facing portion 41a or 41b than in a radially inner portion thereof.

Furthermore, a protruding portion 43a or 43b is provided at the radially outer end portion of each of the magnetic pole-facing portions 41a and 41b. The protruding portion 43a or 43b protrudes in a direction orthogonal to the magnetization direction of the magnetic pole-facing portion 41a or 41b (i.e., protrudes in a radial direction). Concretely, each of the protruding portions 43a and 43b has a taper shape whose length in the circumferential direction gradually decreases toward a radially outer side. The protruding portion 43a or 43b is magnetized in the direction that is the same as the magnetization direction of the magnetic pole-facing portion 41a or 41b, that is, magnetized in the circumferential direction of the rotor 4.

Figure 2:
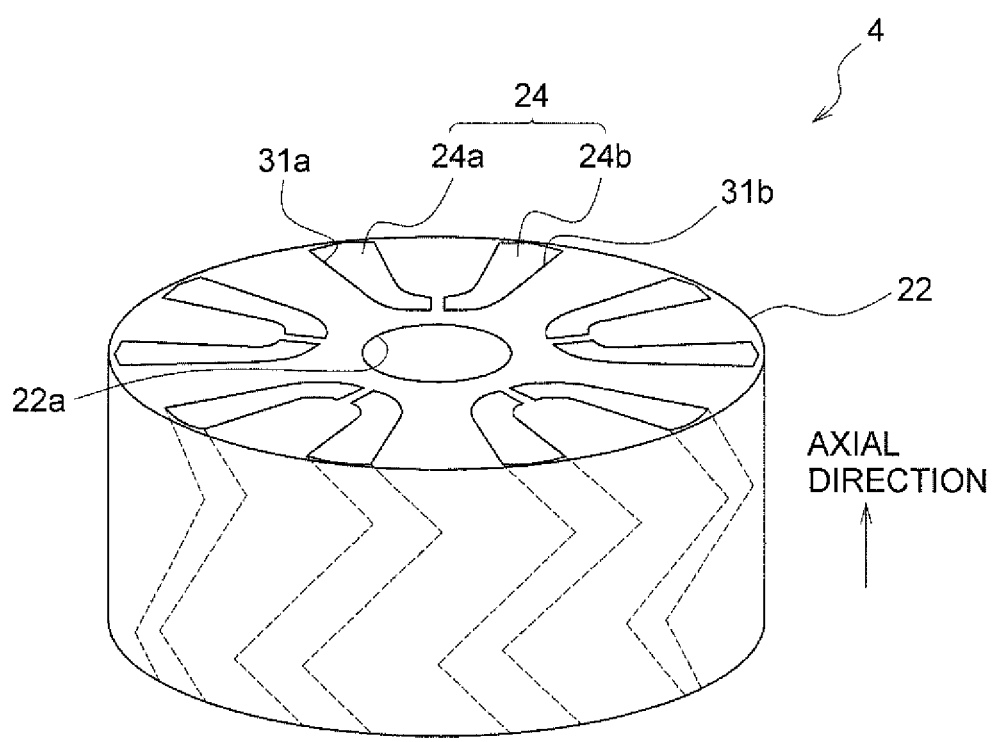
FIG. 2 is a schematic diagram of a configuration of a rotor in the first embodiment.
Figure 3:
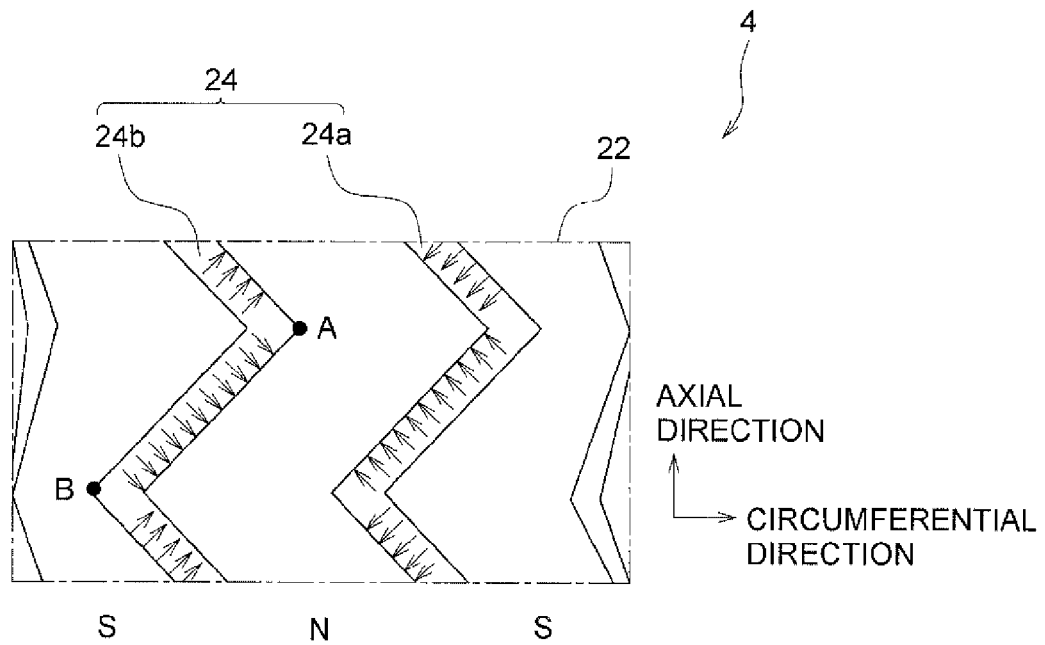
FIG. 3 is a schematic diagram showing the magnetized state of a permanent magnet of the rotor in the first embodiment when

FIG. 2 is a schematic configuration diagram of the rotor 4 in the first embodiment shown in FIG. 1, and FIG. 3 is a schematic diagram showing the magnetized state of the permanent magnet 24 of the rotor 4 in the first embodiment when FIG. 1 is seen in a direction shown by the arrow X in FIG. 1. As shown in FIG. 2, the permanent magnet 24 is bent with respect to the axial direction of the rotor 4. The rotor core 22 is made of a soft magnetic material. For example, the rotor core 22 is a stack body in which a plurality of thin sheets (lamination steel sheets) are stacked and fixed in the axial direction of the rotor 4. Each of the thin sheets is formed in a predetermined shape by stamping a magnetic steel sheet made of a silicon steel sheet or the like, which has been surface-treated for electrical insulation in advance. Concretely, the lamination steel sheets that form the rotor core 22 are stacked together so that the lamination steel sheets are angularly shifted from each other, that is, the lamination steel sheets are stacked in the axial direction so that the lamination steel sheets are shifted from each other in the rotation direction and the plurality of cavities 31a and 31b are formed (a stacking step). Then, the permanent magnets 24 (the magnet pieces 24a and 24b) are molded and disposed in the cavities 31a and 31b by injection molding (a molding step).

In FIG. 3, the magnetization directions of the paired magnet pieces 24a and 24b of the permanent magnet 24 are schematically shown by arrows. As shown in FIG. 3, each of the magnet pieces 24a and 24b has a uniform thickness in the magnetization direction, and each of the magnet pieces 24a and 24b is bent such that a portion from an upper surface in the axial direction to a point A extends toward the right side in the circumferential direction (extends in the direction at an angle of, e.g., 45°, with respect to the axial direction), a portion from the point A to a point B extends toward the left side in the circumferential direction (extends toward the opposite side in the direction at an angle of 45° with respect to the axial direction), and a portion from the point B to a lower surface extends toward the right side in the circumferential direction (extends in the direction at the angle of 45° with respect to the axial direction). Thus, each of the magnet pieces 24a and 24b has a triangular wave shape. The paired magnet pieces 24a and 24b have poles of the same polarity, which face each other in the circumferential direction of the rotor 4. As for the magnetization directions of the magnet pieces 24a and 24b, each of the magnet pieces 24a and 24b is not magnetized in a direction perpendicular to the axial direction of the rotor 4 (i.e., each of the magnet pieces 24a and 24b is not magnetized in the circumferential direction). Each of the magnet pieces 24a and 24b is magnetized in directions perpendicular to the surface of the magnet piece, the surface having the triangular wave shape and having a linear sectional shape (i.e., each of the magnet pieces 24a and 24b is magnetized in the directions of normals to the surface).

Figure 4:
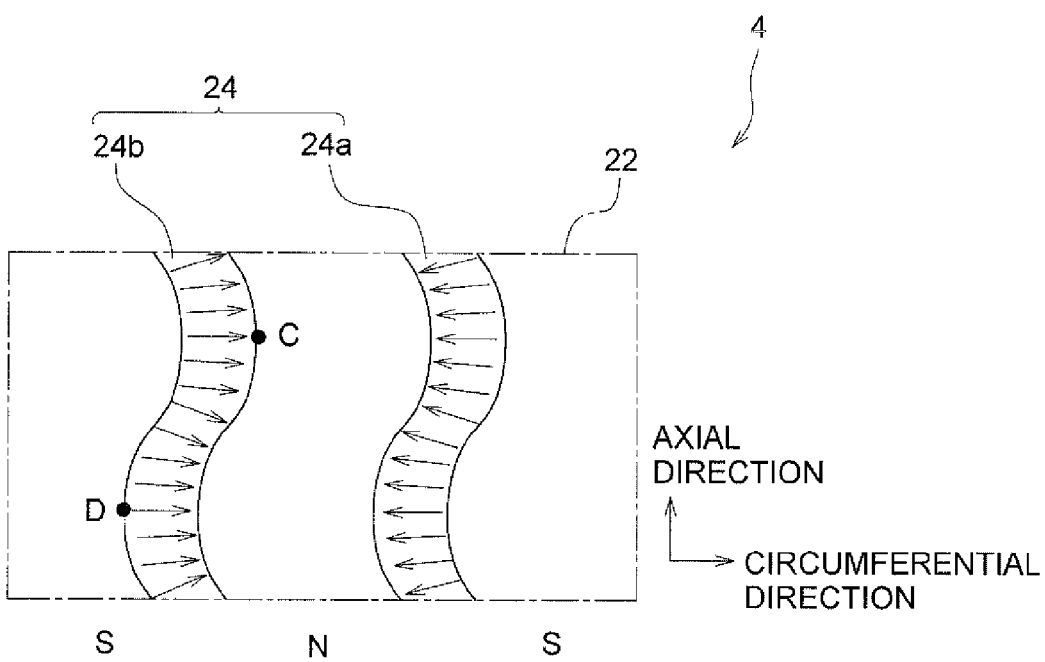
FIG. 4 is a schematic diagram showing the magnetized state of a permanent magnet of a rotor in the second embodiment when

FIG. 4 is a schematic diagram showing the magnetized state of the permanent magnet of the rotor when FIG. 1, which is a sectional view showing a general configuration of the electric motor 1 of the second embodiment, is seen in the direction shown by the arrow X in FIG. 1. In FIG. 4, the magnetization directions of the paired magnet pieces 24a and 24b of the permanent magnet 24 are schematically shown by arrows. As shown in FIG. 4, each of the magnet pieces 24a and 24b has a uniform thickness in the magnetization direction, and each of the magnet pieces 24a and 24b is bent such that a portion from an upper surface in the axial direction to a point C extends toward the right side in the circumferential direction, a portion from the point C to a point D extends toward the left side in the circumferential direction, and a portion from the point D to a lower surface extends toward the right side in the circumferential direction. Thus, each of the magnet pieces 24a and 24b has a generally S shape. The paired magnet pieces 24a and 24b have poles of the same polarity, which face each other in the circumferential direction of the rotor 4. As for the magnetization directions of the magnet pieces 24a and 24b, each of the magnet pieces 24a and 24b is not magnetized in a direction perpendicular to the axial direction of the rotor 4 (each of the magnet pieces 24a and 24b is not in the circumferential direction). Each of the magnet pieces 24a and 24b is magnetized in directions perpendicular to the surface of the magnet piece, the surface having the generally S shape and having a curved sectional shape (i.e., each of the magnet pieces 24a and 24b is magnetized in the directions of normals to the surface).

Next, operation and effects of the electric motors 1 in accordance with the first and second embodiments of the invention will be described below.

According to the first embodiment, the permanent magnets 24 embedded in the rotor core 22 have a uniform plate thickness, and are bent with respect to the axial direction of the rotor 4 so as to have a triangular wave shape. Therefore, it is possible to increase the surface areas, in the axial direction of the rotor 4, of the paired magnet pieces 24a and 24b that have the poles of the same polarity, which face each other in the circumferential direction. Similarly, according to the second embodiment, the permanent magnets 24 have a uniform plate thickness, and are tortuous with respect to the axial direction of the rotor 4 so as to have a generally S shape. Therefore, it is possible to increase the surface areas, in the axial direction, of the paired magnet pieces 24a and 24b that have the poles of the same polarity, which face each other in the circumferential direction. Accordingly, the number of magnetic fluxes of the permanent magnets 24 within the rotor core 22 can be increased. Therefore, the torque output from the electric motor 1 increases when the size of the electric motor 1 remains the same. Thus, the size of the electric motor 1 can be reduced.

Furthermore, according to the first and second embodiments, the magnet pieces 24a and 24b have the poles of the same polarity, which face each other in the circumferential direction of the rotor 4, and each of the magnet pieces 24a and 24b is magnetized in the directions of normals to the surface of the magnet piece, the sectional shape of the surface being a triangular wave shape or a generally S shape. Therefore, the magnetic flux density in the surface of the rotor 4 can be increased, as compared to the case where the permanent magnets are magnetized in a direction perpendicular to the axial direction (i.e., in the circumferential direction). Therefore, a sufficient number of magnetic fluxes of the permanent magnets 24 can be secured even if the permanent magnets 24 whose maximum energy product is small are used. As a result, the size of the electric motor 1 can be reduced while the output torque of the motor remains the same.

Furthermore, the rotor core 22 is formed by stacking (i.e., by rotationally stacking) a plurality of lamination steel sheets so that the lamination steel sheets are angularly shifted from each other and the cavities 31a and 31b are formed. Then, within the cavities 31a and 31b, the paired magnet pieces 24a and 24b of each permanent magnet 24 are molded by injection molding so that each of the magnet pieces 24a and 24b has a shape that is bent or tortuous with respect to the axial direction of the rotor 4. Therefore, the rotor 4 can easily be produced.

As can be understood from the forgoing description, according to the first and second embodiments of the invention, it is possible to provide an electric motor in which a surface area of each of permanent magnets embedded in a rotor core is increased so as to secure a sufficient number of magnetic fluxes of the permanent magnets and to allow size reduction of the electric motor, and it is also possible to provide a production method for the electric motor.

While the first and second embodiments of the invention have been described above, the invention can also be implemented in other configurations.

In the first and second embodiments, the two opposite end surfaces of each permanent magnet 24 in the axial direction (an upper surface and a lower surface of the permanent magnet 24 shown in FIG. 2) coincide with each other in terms of phase (in terms of the positional relation). However, this configuration is not restrictive, and the two opposite end surfaces of each permanent magnet 24 may be formed and disposed apart from each other in the circumferential direction of the rotor 4.

In the first and second embodiments, the sectional shape of each permanent magnet 24 taken along the radial direction is a generally inverted arc shape defined by the magnet pieces 24a and 24b provided with the proximity portions 42a and 42b. However, this configuration is not restrictive. For example, each permanent magnet 24 may have a flat plate shape that radially extends outward from the center of the rotary shaft 21 and that is defined by the magnet pieces 24a and 24b that are formed by only the magnetic pole-facing portions 41a and 41b, respectively.

In the first and second embodiments, the length (thickness) of each of the magnetic pole-facing portions 41a and 41b in the magnetization direction is greater in a radially outer portion than in a radially inner portion. However, this configuration is not restrictive. For example, each of the magnetic pole-facing portions 41a and 41b may have a flat plate shape with a uniform plate thickness.

Although in the first and second embodiments, the permanent magnets 24 are bond magnets, this is not restrictive. For example, neodymium sintered magnets or the like may be used as the permanent magnets 24. Furthermore, although the rotor core 22 is formed by stacking silicon steel sheets in accordance with the shape of the permanent magnets 24, this is not restrictive. For example, a powder magnetic core may be used.

Although in the first and second embodiments, the invention is embodied as electric motors used as drive sources for an electric power steering device, an electric oil pump device, or the like, this is not restrictive. The invention may be applied to a drive source for other types of devices, or may also be applied to an electric generator.

What is claimed is:

1. An electric motor comprising:
  a rotor provided on a rotary shaft; and
  a stator fixed outside an outer peripheral surface of the rotor,
  the rotor including:
  a rotor core fixed to the rotary shaft so as to be rotatable together with the rotary shaft; and
  a plurality of permanent magnets embedded and fixed in the rotor core,
  wherein the permanent magnets extend in radial directions of the rotor and are spaced from each other in a circumferential direction of the rotor and each of the permanent magnets have a magnetic-pole facing portion with a flat plate shape that extends radially and a proximity portion that extends from a radially inner end portion of the magnetic-pole facing portion toward the magnetic-pole facing portion of an adjacent permanent magnet so that the proximity portion of permanent magnets adjacent to each other face each other, and each of the permanent magnets (i) is magnetized in directions normal to a surface of the permanent magnet so that poles of the same polarity face each other in the circumferential direction, (ii) has a uniform thickness and (iii) is bent from one end portion of the rotor to the other end portion of the rotor with respect to a direction of the rotary shaft of the rotor so that the permanent magnet has a triangular wave shape in which a plurality of linear portions are sequentially connected, and
  wherein the magnetic-pole facing portion of each of the adjacent permanent magnets is substantially longer than the proximity portion such that the magnetic-pole facing portions extend generally along a straight line to the proximity portion, the proximity portions defining a curved shaped end of each of the adjacent permanent magnets.

2. The electric motor according to claim 1, wherein,
  each of the permanent magnets further (i) has a thickness in a magnetization direction that increases from a distal end portion to a radially outer end portion and (ii) has a uniform thickness in an axial direction.

3. The electric motor according to claim 1, wherein,
  in an inner peripheral surface of the rotor core, the magnets of the plurality of permanent magnets are arranged in pairs, and each of the pairs of magnets has pole-facing portions with the same polarity that face each other in the circumferential direction.

4. The electric motor according to claim 1, wherein,
  in an inner peripheral surface of the rotor core, the magnets of the plurality of permanent magnets are arranged in pairs, and each of the pairs of magnets has pole-facing portions that are magnetized to have a magnetization direction of each of the pole-facing portions coinciding with a circumferential direction of the rotor.

5. The electric motor according to claim 1, wherein,
  the magnets of the plurality of permanent magnets are arranged in pairs, each magnet of the pairs of magnets has a corresponding proximity portion that extends from a radially inner portion of the magnetic pole-facing portion toward the other magnet in the pair of magnets, and the magnetization direction of each of the proximity portions gradually changes from the circumferential direction to the radial direction toward a distal end of the proximity portion such that each of the magnets is magnetized in a direction that substantially coincides with a direction of a thickness of the magnets.

6. The electric motor according to claim 1, wherein,
  each of the permanent magnets is not only magnetized in the circumferential direction.

7. An electric motor comprising:
  a rotor provided on a rotary shaft; and
  a stator fixed outside an outer peripheral surface of the rotor,
  the rotor including:
  a rotor core fixed to the rotary shaft so as to be rotatable together with the rotary shaft; and
  a plurality of permanent magnets embedded and fixed in the rotor core,
  wherein the permanent magnets extend in radial directions of the rotor and are spaced from each other in a circumferential direction of the rotor and each of the permanent magnets have a magnetic-pole facing portion with a flat plate shape that extends radially and a proximity portion that extends from a radially inner end portion of the magnetic-pole facing portion toward the magnetic-pole facing portion of an adjacent permanent magnet so that the proximity portion of the permanent magnets adjacent to each other face each other, and each of the permanent magnets (i) is magnetized in directions normal to a surface of the permanent magnet so that poles of the same polarity face each other in the circumferential direction, (ii) has a uniform thickness and (iii) is tortuous from one end portion of the rotor to the other end portion of the rotor with respect to a direction of the rotary shaft of the rotor so that the permanent magnet has a generally S shape in which a plurality of curved portions are sequentially connected, and wherein the magnetic-pole facing portion of each of the adjacent permanent magnets is substantially longer than the proximity portion such that the magnetic-pole facing portions extend generally along a straight line to the proximity portion, the proximity portions defining a curved shaped end of each of the adjacent permanent magnets.

8. The electric motor according to claim 7, wherein, each of the permanent magnets further (i) has a thickness in a magnetization direction that increases from a distal end portion to a radially outer end portion and (ii) has a uniform thickness in an axial direction.

9. A production method for an electric motor that includes:

a rotor provided on a rotary shaft; and a stator fixed outside an outer peripheral surface of the rotor, the rotor including:

a rotor core fixed to the rotary shaft so as to be rotatable together with the rotary shaft; and a plurality of permanent magnets embedded and fixed in the rotor core and each of the permanent magnets have a magnetic-pole facing portion with a flat plate shape that extends radially and a proximity portion that extends from a radially inner end portion of the magnetic-pole facing portion toward the magnetic-pole facing portion of an adjacent permanent magnet so that the proximity portion of permanent magnets adjacent to each other face each other, wherein each of the permanent magnets is magnetized in directions normal to a surface of the permanent magnet so that poles of the same polarity face each other in the circumferential direction, the magnetic-pole facing portion of each of adjacent permanent magnets being substantially longer than the proximity portion such that the magnetic-pole facing portions extend generally along a straight line to the proximity portion, the proximity portions defining a curved shaped end of each of the adjacent permanent magnets, the production method comprising:

a stacking step of forming the rotor core by stacking a plurality of lamination steel sheets so that the lamination steel sheets are angularly shifted from each other and cavities are formed, each of the cavities being bent or curved with respect to a direction of the rotary shaft of the rotor; and a molding step of molding and disposing the permanent magnets in the cavities by injection molding.

* * * * *